No. 765,702.

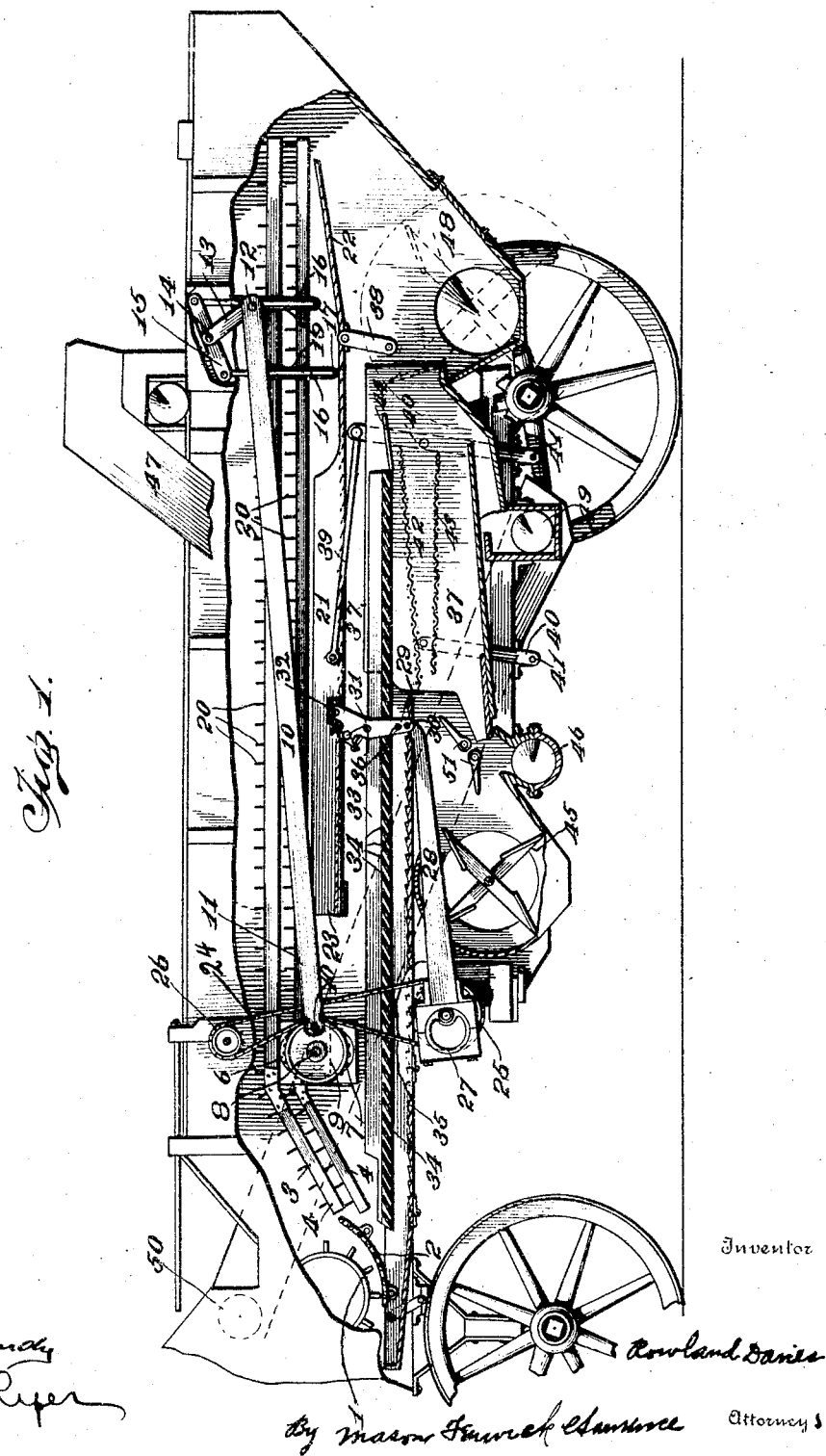

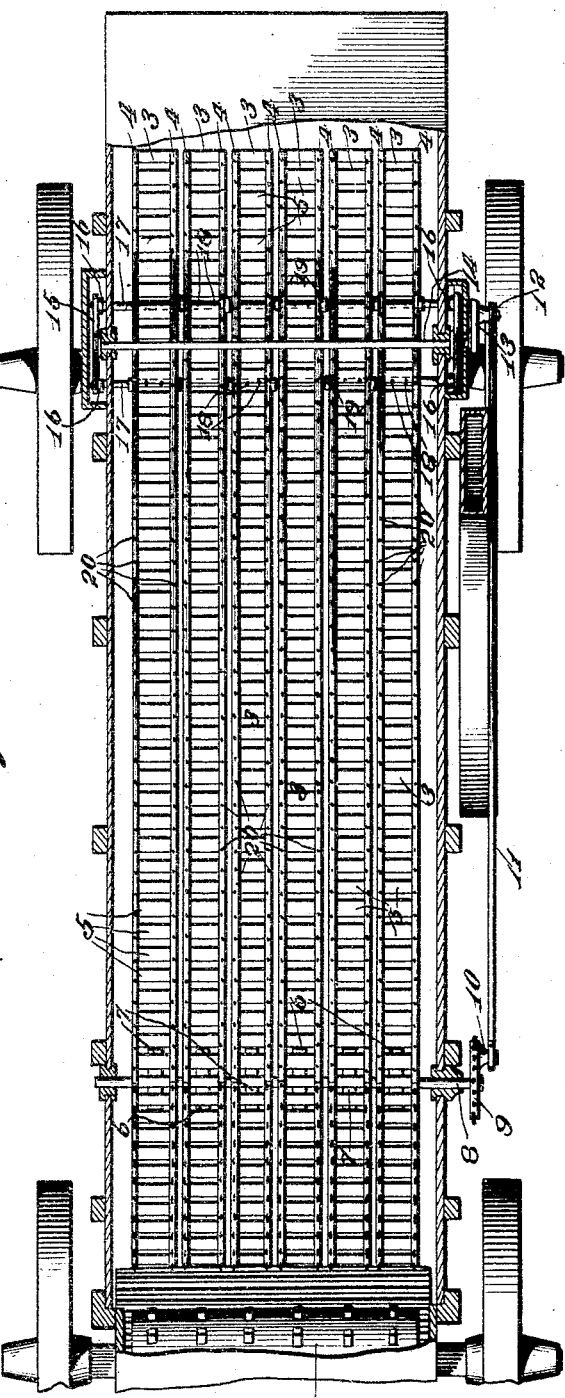

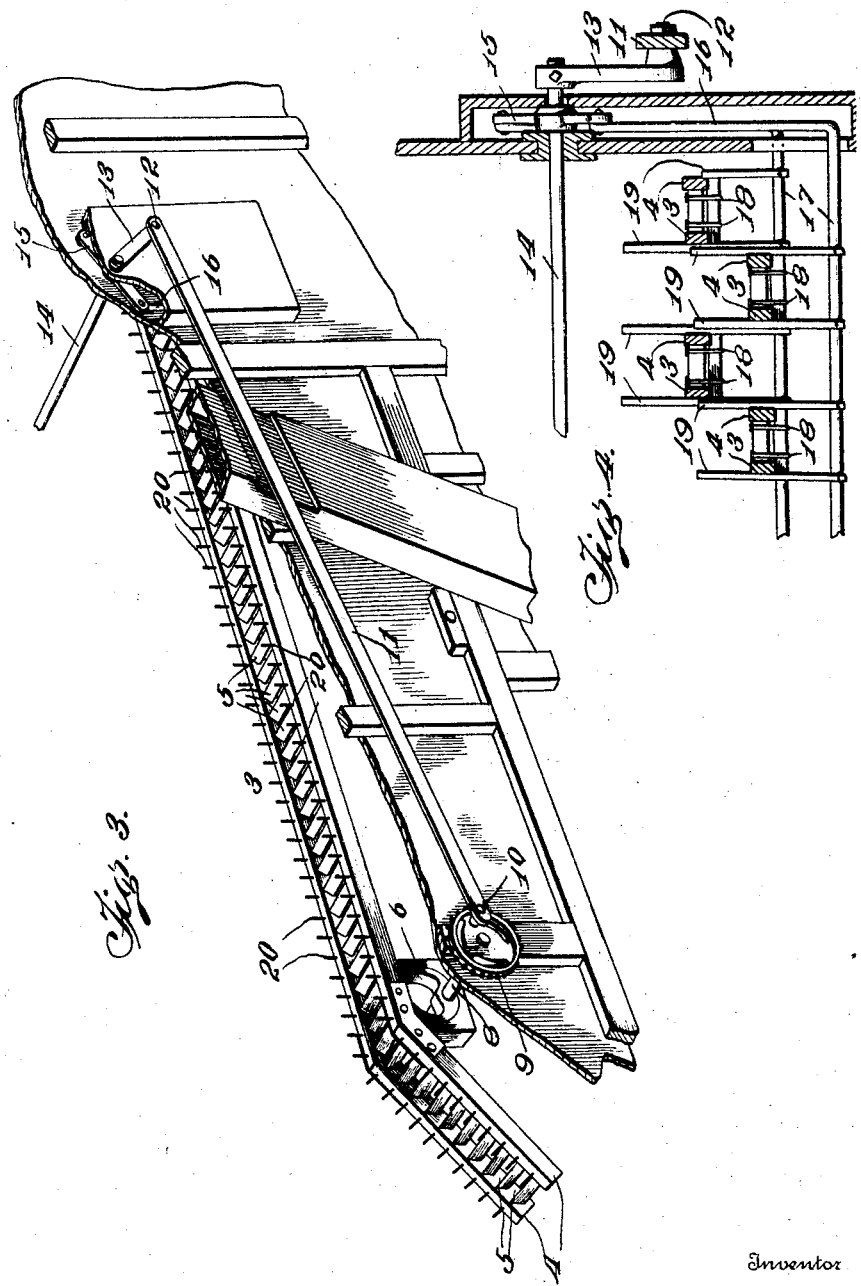

Patented July 26, 1904.

UNITED STATES PATENT OFFICE.

ROWLAND DAVIES, OF UTICA, WISCONSIN.

SEPARATING DEVICE FOR THRESHING-MACHINES.

SPECIFICATION forming part of Letters Patent No. 765,702, dated July 26, 1904.

Application filed December 17, 1902. Serial No. 135,635. (No model.)

*To all whom it may concern:*

Be it known that I, ROWLAND DAVIES, a citizen of the United States, residing at the town of Utica, in the county of Winnebago and State of Wisconsin, have invented new and useful Improvements in Separating Devices for Threshing-Machines, of which the following is a specification.

My invention relates to a separating device for a threshing-machine; and it consists, essentially, of a double separating system, the object being to first separate the coarse straw without carrying with it any of the grain and then by means of a second separator to thoroughly separate the fine straw and chaff from the grain. By this means no grain is wasted or carried into the straw-stack and the possibility of clogging the machine is obviated.

With these and other objects in view the invention consists of certain novel constructions, combinations, and arrangements of parts, as hereinafter more particularly described and claimed.

In the accompanying drawings, Figure 1 represents a side view of my invention. Fig. 2 represents a plan view, and Fig. 3 a perspective view, of the first or upper separating device; and Fig. 4 is a detail sectional view.

Similar numerals refer to similar parts throughout the several views.

1 represents the ordinary cylinder of a threshing-machine.

2 represents a transverse grate extending from below the cylinder upwardly to the first separator. The first separator consists of a series of horizontally-extending frames or sections 3 3 3, &c., similar in their construction to ladders, each consisting of side rails 4 4 and cross rungs or slats 5 5 5, &c. These frames or sections of the separator curve or incline downward in front toward the cylinder, so that the revolution of the cylinder carries and blows the straw up on the top of the first separator. The sections of the first separator near the front are mounted upon two series of eccentrics 6 6 6 and 7 7 7, arranged alternately, so that when in the operation the bearing-box of one of the frames or sections is at any given position the bearing-box of the next contiguous section will be at the diametrically opposite point of the eccentric. The shaft 8 carries and operates the eccentrics, power being applied to the shaft 8 by means of the sprocket-chain 24, operating the sprocket-wheel 9, which has a crank-pin 10, carrying a pitman 11, connected at 12 with a double angle T-lever 13, which is connected with a rock-shaft 14, extending transversely across and above the frames 3 3 3, &c., and having bearings in the sides of the threshing-machine. To the opposite ends of the rock-shaft 14 is attached another T-lever 15, and from each arm of the T-lever on each side depend links 16 16, which support the bars 17 17, extending transversely beneath the frames 3 3 3, &c., and being attached alternately by means of bolts 18 18 18, &c., passing through cross-pieces pivotally supported by upwardly-extending flexible slats 19 19 19, &c., interposed between the sections for the purpose of keeping them in alinement as they pass up and down past each other, the slats being carried by the bars 17 17. The position of the crank-arm 10 upon the wheel 9 is at such a position in accordance with the eccentrics that the pitman 11 will operate the T-lever to raise and lower the rear end of each section exactly the same as the operation of the eccentrics raises and lowers the front end and the links 16 16, &c., to accommodate the eccentric motion, so that at all times the several sections of each set are parallel with each other and each alternate section is in an opposite phase of movement to the next contiguous section. The motion of contiguous sections is reciprocal. The eccentrics also operate to give a forward motion to the straw from the cylinder toward the straw-conveyer. To assist in this, pins 20 20 20, &c., are inserted in each rail of the frame. The straw by this oscillating movement is tossed or bounced forward upon the frames or sections of the separator to the end where it is carried away by a conveyer into the stack. The grain becomes thoroughly separated and with the finer straw drops between the slats 5 5 5, &c., onto the returning-pan 21, which consists of an imperforate bottom slightly turned or inclined upwardly at the rear end 22 and having inclosing sides and an open front 23.

24 represents a sprocket-chain conveying equivalent motion from the sprocket-wheel 25 to the sprocket-wheel 9 operating the first separator. The sprocket-wheel 25 is mounted upon a transverse shaft journaled to braces below the threshing-machine frame and deriving its motion from any suitable mechanism upon the opposite side. (Not shown.)

26 represents a tightener to regulate the tension of the sprocket-chain 24. The sprocket-wheel 25 operates the eccentric 27, carrying the pitman 28, connected with the rocker-arm 29 at 30, which is pivoted to the frame at 31 and attached at its upper end 32 to the returning-pan 21.

33 represents the second separator provided with a transversely-slatted bottom 34, the slats inclining upwardly toward the rear of the machine, so that in its oscillating motion the chaff will be pushed to the rear and the grain be permitted to drop through to the grain-bottom 35, which oscillates with the second separator 33. Both the second separator 33 and the grain-bottom 35 are hung to the rocker-arm 29 at 36. The pitman 28 operates to carry the second separator and the grain-bottom toward the rear of the machine at the same time that the returning-pan 21, attached to the opposite end 32, is carried toward the front of the machine. A reciprocal motion is created. The returning-pan 21 carries the grain and fine straw and chaff that have dropped through the first separator toward the front end and drops it forward of the shoe 37 upon the second separator 33. The grain-bottom 35 is provided with transverse corrugations inclining upwardly toward the rear for the purpose of carrying the grain back to the screens carried by the shoe 37.

38 represents a rocking support for the rear end of the returning-pan 21.

The screen 42 is, as will be observed, positioned in a horizontal plane beneath that occupied by the grain-bottom 35, and the discharge end of said grain-bottom is slightly narrower than the shoe 37, so as to admit of said end entering the forward end of the shoe and discharging the chaff onto the screen 42.

The shoe 37 is oscillated by the pitman 39, pivoted to the returning-pan 21 and supported by the braces 40 40, rocking on the pivots 41 41 on each side. The shoe carries the chaffer 42 and sieve 43 or any screens to adapt the machine to different kinds of grain.

44 represents a transverse comb attached to the rear of the second separator.

45 represents the fan; 46, the grain-auger; 47, the grain-elevator; 48, the straw-blower; 49, the tailings-auger, and 50 the upper end of the tailings-elevator.

51 represents a hinged tail-board extending transversely in front of the blower to properly regulate the suction.

By means of my invention the straw and grain are first carried and blown by the cylinder upwardly on the first separator, except such fine grain as may drop through the grate 2 upon the grain-bottom 35. The straw is bounced along upon the first separator to the straw-conveyer and is thoroughly shaken of all grain. The grain and chaff falling through the first separator are then carried forward upon the returning-pan and permitted to drop from the front end onto the second separator at a position forward of the shoe. The oscillation of the second separator carries back the chaff and permits the grain to drop through the slats onto the grain-bottom, which carries it back to the screens in front of the fan, where it is winnowed and elevated in the usual manner. The straw is blown through the ordinary conveyer (not shown) to the stack.

Having thus fully described my invention, what I claim as new, and desire to secure by Letters Patent, is—

In a threshing-machine, the combination with a framework, of a main separator comprising ladder-like sections extending longitudinal of the framework, means for imparting a gyratory and a reciprocatory movement to said sections, a return-pan mounted beneath said sections, a grain-floor beneath the discharge end of said pan, means for actuating said floor, connections between said floor and pan for actuating the pan, a grain-shoe beneath said pan in line with said floor, screens carried by said shoe, a link carried by said pan, and a lever connected to said shoe and also connected to said link for actuating said shoe in an opposite sense from the actuation of said floor.

In testimony whereof I have hereunto set my hand in the presence of two subscribing witnesses.

ROWLAND DAVIES.

Witnesses:
KATHRINE DAVIES,
IVOR H. DAVIES.